March 12, 1968     W. D. ANDERSON     3,373,429
NAVIGATIONAL INSTRUMENT
Filed Oct. 24, 1965     2 Sheets-Sheet 1
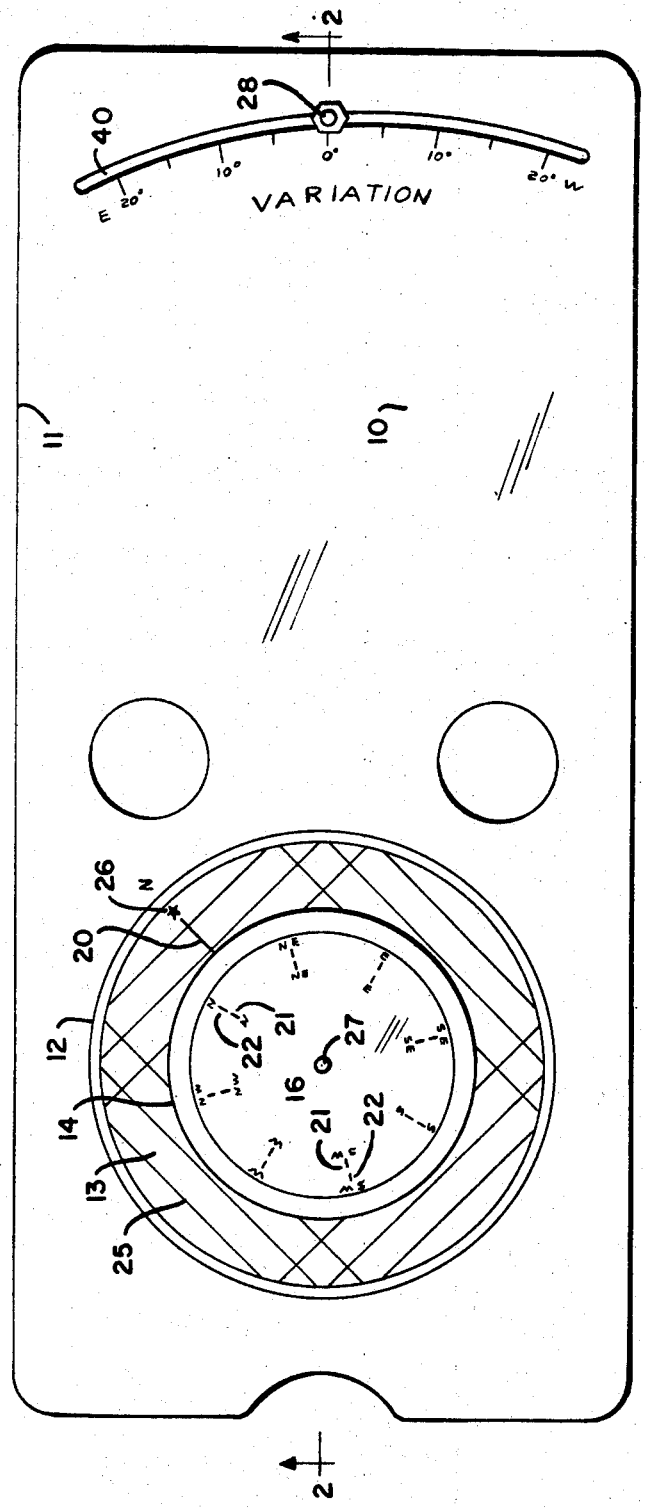
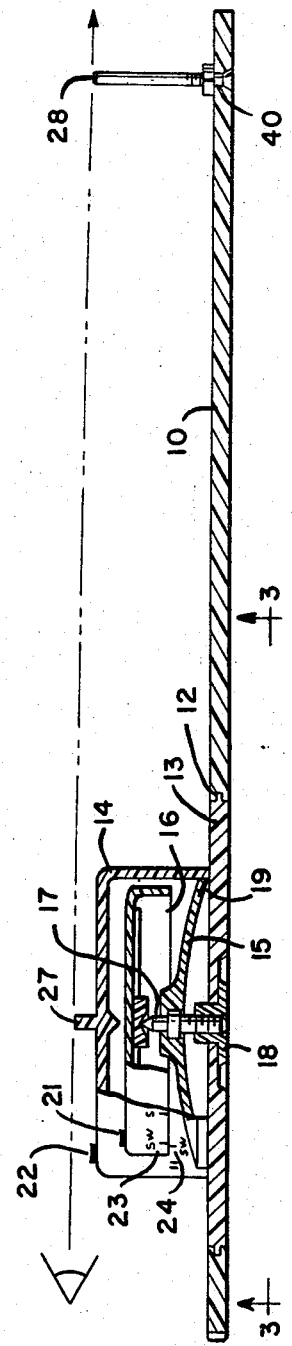
INVENTOR.
WARREN D ANDERSON
BY
ATTORNEY United States Patent Office 3,373,429
Patented Mar. 12, 1968

3,373,429
NAVIGATIONAL INSTRUMENT
Warren D. Anderson, 421 Ocean Drive W.,
Stamford, Conn. 06902
Filed Oct. 24, 1965, Ser. No. 504,585
6 Claims. (Cl. 343—115)

ABSTRACT OF THE DISCLOSURE

A navigational instrument which eliminates the necessity for reading any bearing angles in sighting a known object and plotting the corresponding line of position on a chart.

---

This invention relates to navigational instruments and particularly to an improved instrument for determining the bearing of a charted object and then plotting the corresponding line of position on a chart.

On the high seas, celestial or electronic methods are used to determine position. In coastal waters, the navigator generally determines the bearing of a charted object and then plots it on the chart. The procedure required the use of an instrument to determine the bearing angle of a charted object and also an instrument for plotting the line of position on the chart. Prior instruments have been slow and difficult to manipulate since they required manual setting of the instruments and accurate reading of bearing angles. For example, when using an alidade or a radio direction finder, it is necessary to read the bearing angle from the compass rose of the instrument and then reset this angle on the compass rose of the chart or on a chart protractor in order to plot the line of position.

Instruments combining the functions of a pelorus and a chart protractor have been used whereby the bearing angle of the sighted object is transferred mechanically to the chart, such instruments requiring manual adjustment and the reading of compass angles in order to correlate the pelorus card with the ship's compass.

A principal object of this invention is to provide an instrument which completely eliminates the necessity for reading any bearing angles in sighting a known object and plotting the corresponding line of position on a chart.

A further object of the invention is to provide an instrument which, when adjusted to the variation of the chart, will automatically convert the magnetic bearing of the sighted object to a true bearing as plotted on the chart.

In one aspect of the invention, the protractor may have a position plotting straight edge and a compass card thereon. The compass card can be enclosed and serve as a reference for an oscillatable member which is oriented relative to a grid pattern thereon. The relation of the grid pattern in relation to the indicia on the oscillatable member can be set in accordance with the magnetic variation. The alidade has a directional finding means which can be sighted on the object concerned. The directional finding means may be the conventional sighting means or can be a radio direction finder mounted on the base of the protractor. In the radio direction finding form, compensators and correctors for magnetic fields can be provided.

In a further aspect of the invention, the magnetic variation can be set in the instrument by rotating the directional finding means relative to the grid means.

The above, other objects and novel features of the invention will become apparent from the following specification and accompanying drawings which are merely exemplary.

In the drawings:

FIG. 1 is a top view of an instrument made in accordance with the present invention;

FIG. 2 is a sectional view taken along line 2—2 of FIG. 1;

Figure 4:
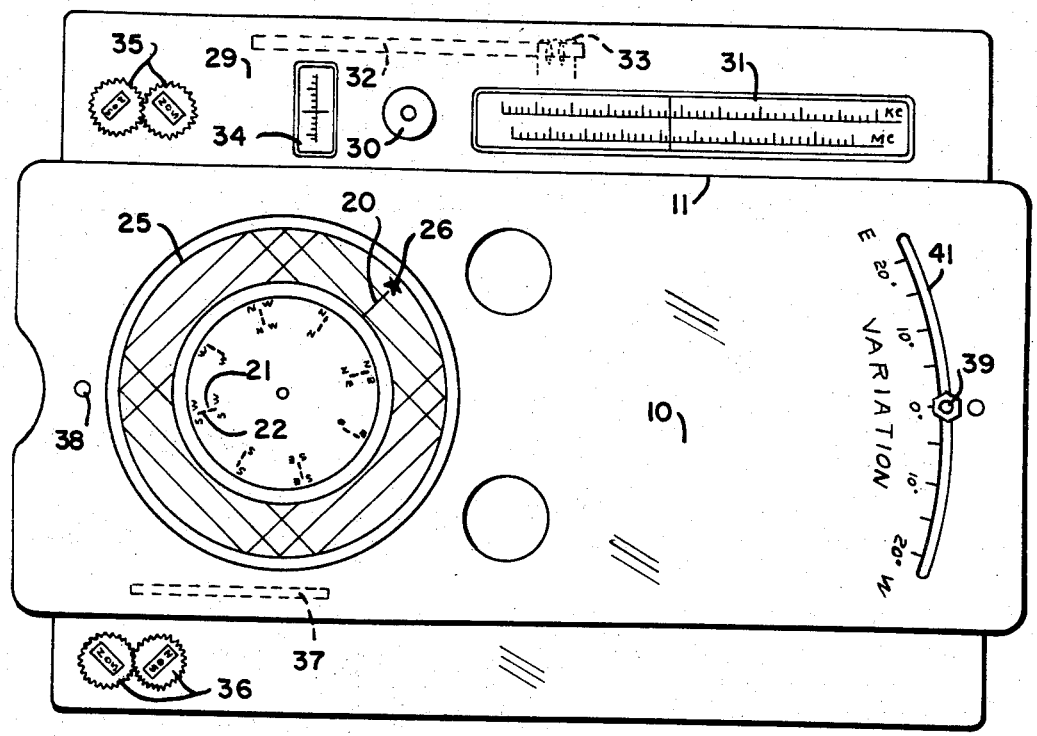
FIG. 4 shows the instrument adapted for use with a radio direction finder.

Referring to FIG. 1, base 10 has a straight-edge portion 11 and a circular groove 12 in which transparent disc 13 is a close rotating fit. A magnetic compass comprising transparent cover 14, opaque bottom 15, compass card 16 and support pivot 17, is mounted at the center of circular disc 13 by means of knurled nut 18 which, when loosened, allows cover 14 and bottom 15 to be angularly adjusted relative to disc 13.

Figure 3:
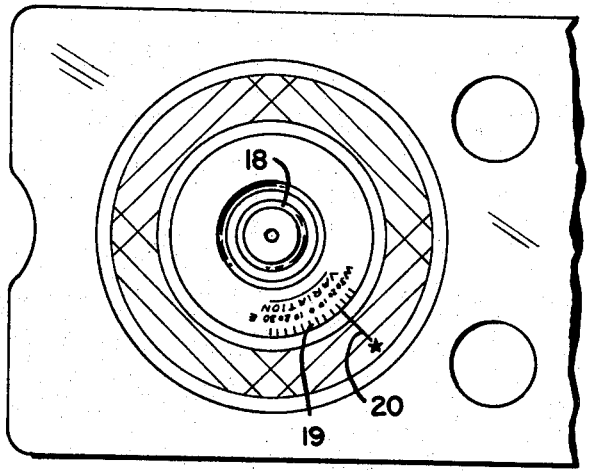
FIG. 3 is a bottom view of FIG. 1 taken along line 3—3 of FIG. 2.

Referring to FIGS. 2 and 3, the underside of bottom member 15 carries a variation scale 19 which may be read against index line 20 on disc 13. Compass card 16 is marked on its top surface with the cardinal points 21 of the compass. Transparent cover 14 carries an orientation pattern 22 so that when viewed from above, disc 13 and cover 14 may be rotated to a unique position of angular coincidence with compass card 16.

A similar pattern of cardinal points 23 is marked on the side of card 16 and a matching pattern 24 is marked on the side of cover 14 to permit adjusting of disc 13 to a unique angular coincidence with card 16 while viewing the cover 14 and card 16 from the side. The pattern marked on card 16 and the matching pattern on cover 14 need not be compass points, but may be any non-symmetrical, non-repeating pattern which will enable disc 13 to be adjusted to a unique angular coincidence with card 16.

Disc 13 carries an alignment pattern 25 for aligning the instrument with the chart grid when plotting a line of position. The alignment pattern is shown as a rectangular grid, although any suitable pattern of lines, dots, crosses, etc., might be used. The alignment pattern lines are respectively parallel and perpendicular to the North axis of the pattern which coincides with line 20 and is identified by a star insignia 26 which in use is oriented toward the North edge of the chart. Before use, the North axis of the alignment pattern is displaced from the North axis of the orientation pattern 22 by an angle equal to the variation angle of the chart.

The alignment of the instrument with the known object may be accomplished by means of visual sights 27 and 28, which establish a line of sight parallel to straight edge 11.

Alternatively, referring to FIG. 4, the instrument may incorporate a radio direction finder 29 for aligning the instrument with a known radio transmitter. As is well known in the art, the radio direction finder may consist of a tuning knob 30 and tuning scale 31 for tuning the direction finder to the broadcast frequency of a known radio station. The antenna may consist of a ferrite rod 32, with coupling coil 33, which has the property of giving a minimum signal when the axis of the rod is aligned with the transmitter as indicated by null-meter 34. In this invention, the radio direction finder is fastened to the plotting instrument by pins 38 and 39 so that the axis of rod 32 is parallel to straight edge 11.

It is well known that radio direction finders, in common with other types of radio receivers, have permanent and induced magnetic fields which will cause deviation errors when used in proximity to a magnetic compass. To correct for these deviations, the radio direction finder 29 is provided with correctors consisting of geared permanent magnets 35 and 36 as well as a ferrite or "soft" iron bar 37. These correctors are adjusted in a manner similar to that used for correcting the deviation caused by the permanent and induced magnetism of a ship acting on a ship's compass.

In the above visual and radio-direction-finder versions, the instrument was calibrated to the chart variation by displacing the North axis 20 of the alignment pattern from the North axis of orientation pattern 22 by an angle equal to the variation of the chart.

Alternatively, this calibration may be accomplished by fixing the North axis 20 of the alignment pattern in registration with the North axis of orientation pattern 22, and then displacing the directional means from the straight edge means by an angle equal to the variation of the chart.

Referring to FIG. 1, the line of sight might be rotated relative to straight edge 11 by moving sight 28 in circular slot 40 through an angle equal to the variation of the chart.

Referring to FIG. 4, radio direction finder 29 might be rotated relative to straight edge 11 by providing a circular slot 41 in base 10 so that pin 39 and direction finder 29 may be rotated relative to straight edge 11 through an angle equal to the variation of the chart.

The instrument of FIG. 1 after having been set to the variation of the chart, is sighted on a known object, and disc 13 is rotated until orientation pattern 24 matches compass pattern 23. The instrument is then placed on the chart with straight edge 11 passing through the symbol for the sighted object, and with grid 25 in alignment with the chart grid, the line of position is then drawn along straight edge 11 through the sighted object.

Similarly, the instrument of FIG. 4, having been set to the variation of the chart, is aligned with a known radio transmitter, and orientation pattern 22 is rotated to match pattern 21. Base 10 is then disengaged from pins 38 and 39 and placed on the chart to plot the line of position as previously described.

Each form of plotting instrument above described combines certain elements of known navigational devices; specifically, the directional means and compass card of the alidade, plus the alignment pattern, or grid, and the pivoted straight edge of a course protractor, such as the Hoey protractor shown in "Bowditch." The combination of these elements in a single instrument allows the protractor to be set directly to the alidade without the necessity of reading the alidade bearing angle, correcting for variation, then setting the protractor to the corrected bearing angle.

For example, in setting a conventional course protractor to an alidade bearing angle, the following steps are required each time that a line of position is to be plotted:

(1) Sight alidade on known object.
(2) Read magnetic bearing angle from alidade compass scale.
(3) Record or remember the magnetic bearing angle.
(4) Add or subtract the variation angle of the chart to obtain the true bearing angle.
(5) Set the protractor to the true bearing angle.

With the plotting instrument of this invention, the chart variation is set into the instrument and then only the following steps are required each time that a line of position is to be plotted:

(1) Sight instrument on known object.
(2) Set orientation pattern to compass card.

The elimination of extra steps provides greater speed and safety in plotting a line of position under the conditions present at sea, particularly if the navigator must also attend to other duties affecting the safety of the ship.

It should be apparent that the details of construction can be changed without departing from the spirit of the invention except as defined in the appended claims.

What is claimed is:

1. In a navigational instrument, the combination including a course protractor having straight edge means and rotatable grid means having a compass index mark thereon for alignment with a chart, alidade means having a compass card and directional means adjustably coupled to said straight edge means and said grid means and arranged for manual orientation relative to said compass card and said protractor, the construction and arrangement of parts being such that when said directional means is aligned with an object and the grid means is oriented by said index to mark to the North seeking position of the compass card, the protractor will define the true bearing angle corresponding to the magnetic bearing of the alidade, said directional means comprising a radio direction finding antenna.

2. The instrument of claim 1 wherein the alidade has compensators for permanent and induced magnetism.

3. In a navigational instrument, the combination including a course protractor having straight edge means and rotatable grid means including a compass index mark thereon for alignment with a chart, directional means coupled with said straight edge means for aligning the protractor with an object, a compass card pivoted relative to said protractor, manual means for orienting said grid means and index mark with respect to said compass card and said protractor, the construction and arrangement of the parts being such that when said directional means is aligned with an object and the grid means is oriented by said index mark to the North seeking position of the compass card, the protractor will define the true bearing angle corresponding to the magnetic bearing of the alidade, said grid means being rotatable relative to said straight edge means.

4. An instrument according to claim 3 wherein said manual means includes means oscillatable on said protractor to match the position of said compass card.

5. An instrument according to claim 4 wherein the manual means includes means for displacing indicia thereon relative to said grid means at an angle corresponding to chart variation.

6. An instrument according to claim 4 wherein said manual means includes a casing within which said compass card is mounted, said casing being manually rotatable on said protractor.

References Cited

UNITED STATES PATENTS

| | | | |
|---|---|---|---|
| 2,111,829 | 3/1938 | Winterer et al. | 33—72 |
| 2,822,618 | 2/1958 | Wendel | 33—72 |
| 3,115,635 | 12/1963 | Leeming et al. | 343—113 |

FOREIGN PATENTS

| | | |
|---|---|---|
| 1,264,544 | 5/1961 | France. |

RODNEY D. BENNETT, *Primary Examiner.*

R. E. BERGER, *Assistant Examiner.*